(12) United States Patent
Bezos et al.

(10) Patent No.: US 6,606,608 B1
(45) Date of Patent: Aug. 12, 2003

(54) METHOD AND SYSTEM FOR PROVIDING A DISCOUNT AT AN AUCTION

(75) Inventors: Jeffrey P. Bezos, Seattle, WA (US); John Albert Overdeck, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 0 days.

(21) Appl. No.: 09/357,534

(22) Filed: Jul. 19, 1999

(51) Int. Cl.⁷ .............................................. G06F 17/60
(52) U.S. Cl. ............................. 705/37; 705/26; 705/27; 705/35; 705/36
(58) Field of Search ..................... 705/26–27, 30–31, 705/33, 35–45

(56) References Cited

U.S. PATENT DOCUMENTS 5,732,400 A * 3/1998 Mangler et al. .............. 705/26
6,260,024 B1 * 7/2001 Shkedy ........................ 705/37

FOREIGN PATENT DOCUMENTS

WO    WO 97/37315    * 10/1997    ........... G06F/17/60

OTHER PUBLICATIONS

Online Auction First, Apr. 6, 1999, Business Wire, pp. 1–2.*

* cited by examiner

*Primary Examiner*—Frantzy Poinvil
*Assistant Examiner*—Richard Fults
(74) *Attorney, Agent, or Firm*—Perkins Coie LLP

(57) ABSTRACT

A method and system for conducting an auction. The auction system provides a mechanism that allows the winning bidder to receive a discount from the winning bid amount when a certain discount criteria is met. The discount criteria is met when the winning bidder was the first bidder to place the bid at the auction. That is, the bidder who places the first bid will receive a discount (e.g., 10%) if that bidder is ultimately successful in winning the auction. The mechanism, tracks whether each auction is subject to a "first bidder discount" and whether the winning bidder was the first bidder. The offering of a first bidder discount and the amount of any discount may be at the discretion of the seller of the item.

54 Claims, 7 Drawing Sheets

Auction - Sell an Item

- Name: [101]
- Description: [102]
- Add a Picture: [103]
- Bidding Starts at: $ [104]
- Type of Auction: ● Standard  ○ Dutch  [ ] Quantity [105]
- Duration: 7 days ▼ [106]

( List Item )

*FIG. 1*

Auction - Place a Bid at a glance (205)

Name of Item (201)

bid history (206)

Item Description and Photo (202)

203:
- Seller: John Doe
- Highest Bidder: No bids
- Closes Within: 1 hour
- Quantity: 1
- # of Bids: 0
- Starting Bid: $9.99

204
Please enter your bid

Bids start at: $9.99

Enter your maximum bid $ [        ]

[Bid NOW!]

Details

207

Photo

Description

*FIG. 2*

Auction - Sell an Item

Name: [        ]

Description: [        ]

Add a Picture: [        ]

Bidding Starts at: $ [        ]

Type of Auction: ● Standard
○ Dutch  [        ] Quantity

Duration: [ 7 days ▼ ]

1st Bidder 10% Discount: ● Yes  301
○ No

Auction - Place a Bid at a glance          Name of Item bid history          Item Description and Photo
                                                              401
                     Seller:         John Doe         Please enter
                                                      your bid to be
                Highest Bidder:      No bids          eligible for a
                                                       10% discount
                 Closes Within:      6 days,
                                     23 hours         Bids start at:
                                                         $9.99
                     Quantity:       1                Enter your
                                                      maximum bid
                     # of Bids:      0                $ ▭

Starting Bid:     $9.99            Bid NOW!

402  If you place the 1st bid on this item and ultimately
                   win this auction, you will receive a 10% discount
                   from the seller.

Details

Photo

Description

*FIG. 4*

Auction - Place a Bid

| Name of Item |

Item Description and Photo at a glance bid history

Seller: John Doe

Highest Bidder: Jane Smith

Closes Within: 6 days, 21 hours

Quantity: 1 # of Bids: 1

Starting Bid: $9.99

Current Bid: $9.99

Bid Increment: $ .50

Minimum Bid: $10.49

Please enter your bid

Minimum bid: $10.49

Enter your maximum bid $ ☐

[Bid NOW!]

501  Since Jane Smith was the first bid, Jane Smith will receive a 10% if Jane Smith ultimately places the highest bid.

*FIG. 5*

METHOD AND SYSTEM FOR PROVIDING A DISCOUNT AT AN AUCTION

TECHNICAL FIELD

The present invention relates generally to conducting commercial transactions, and more particularly, to conducting auctions.

BACKGROUND

Because it facilitates electronic communications between vendors and purchasers, the Internet is increasingly being used to conduct "electronic commerce." The Internet comprises a vast number of computers and computer networks that are interconnected through communication channels. Electronic commerce refers generally to commercial transactions that are at least partially conducted using the computer systems of the parties to the transactions. For example, a purchaser can use a personal computer to connect via the Internet to a vendor's computer. The purchaser can then interact with the vendor's computer to conduct the transaction. Although many of the commercial transactions that are performed today could be performed via electronic commerce, the acceptance and wide-spread use of electronic commerce depends, in large part, upon the ease-of-use of conducting such electronic commerce. If electronic commerce can be easily conducted, then even the novice computer user will choose to engage in electronic commerce. Therefore, it is important that techniques be developed to facilitate conducting electronic commerce.

The World Wide Web portion of the Internet is especially conducive to conducting electronic commerce. Many web servers have been developed through which vendors can advertise and sell product. The products can include items (e.g., music) that are delivered electronically to the purchaser over the Internet and items (e.g., books) that are delivered through conventional distribution channels (e.g., a common carrier). More generally, an item is any product, server, or exchangeable entity of any type. A server computer system may provide an electronic version of a catalog that lists the items that are available. A user, who is a potential purchaser, may browse through the catalog using a browser and select various items that are to be purchased. When the user has completed selecting the items to be purchased, the server computer system then prompts the user for information to complete the ordering of the items. This purchaser-specific order information may include the purchaser's name, the purchaser's credit card number, and a shipping address for the order. The server computer system then typically confirms the order by sending a confirming web page to the client computer system and schedules shipment of the items.

The World Wide Web is also being used to conduct other types of commercial transactions. For example, some server computer systems have been developed to support the conducting of auctions electronically. To conduct an auction electronically, the seller of an item provides a definition of the auction via web pages to a server computer system. The definition includes a description of the item, an auction time period, and optionally a minimum bid. The server computer system then conducts the auction during the specified time period. Potential buyers can search the server computer system for an auction of interest. When such an auction is found, the potential buyer can view the bidding history for the auction and enter a bid for the item. When the auction is closed, the server computer system notifies the winning bidder and the seller (e.g., via electronic mail) so that they can complete the transaction.

FIG. 1 illustrates a web page through which a seller lists an item to be auctioned. The web page 100 includes a name field 101, a description field 102, an add-a-picture field 103, a minimum bid field 104, an auction type, field 105, and a duration field 106. A seller enters the name of the auction (e.g., "Barbie Doll-1959") in the name field and a description of the item to be auctioned in the description field. If the seller has a picture of the item, the seller can provide a link to that picture in the add a picture field. The seller enters the minimum bid into the minimum bid field. The seller also selects the type of auction. In this example, the auction may be designated as "standard" or "Dutch." A standard auction is an auction in which one item is to be auctioned and the bidder who places the highest bid wins the auction. A Dutch auction is an auction in which more than one of the same type of item is to be auctioned. For example, a seller may have 10 gold wrist watches to sell. In this example, a gold wrist watch is sold to the bidders who placed the 10 highest bids. In a Dutch auction, the final auction price is the price of the lowest winning bid. That is, each winning bidder pays the same amount as the lowest winning bid. The seller enters the duration of the auction in the duration field.

FIG. 2 illustrates a web page through which a bidder may bid for the item being auctioned. The web page 200 includes a name field 201, a detailed a information link 202, an auction status area 203, a bidding area 204, an at-a-glance link 205, a bid history link 206, and a detailed information area 207. The name field contains the name of the auction. The detailed information link allows the bidder to display detailed information about the item being auctioned, such as a picture and description of the item as shown in the detailed information area. The auction status area contains information describing the current state of the auction. For example, the auction status area identifies the seller, identifies the highest bidder, indicates when the auction will close, indicates the quantity of the item that is being auctioned, the number of bids that had been received, and the minimum bid. A bidder enters a bid through the bidding area. The bidder enters the maximum bid that they are willing to pay for the item and then selects the bid now button. The auction system may automatically place bids for the bidder up to that maximum amount. The bidder selects the bid now button to place the bid.

Although auctions have traditionally been seen as an efficient means to arrive at a fair market price for the item being auctioned, auctions of a fixed duration may see bidding activity clustered toward the end of the duration. That is, it appears that bidders maybe reluctant to place the first bid for an item. The bidders may delay placing their bids on the assumption that the final price will be higher if a bid is placed early in the auction. The belief among bidders may be that a long period of active bidding may result in a higher final price then a short period of active bidding. Sellers, of course, would like to encourage a long period of active bidding to maximize the final sale price. It would be desirable to have a bidding system that would encourage bidders to bid early and encourage bidding to precede at higher prices.

SUMMARY

A method and system for conducting an auction is provided. The auction system provides a mechanism that allows the winning bidder to receive a discount from the winning bid amount when a certain discount criteria is met. In one embodiment, the discount criteria is met when the winning bidder was the first bidder to place the bid at the auction. That is, the bidder who places the first bid will receive a discount (e.g., 10%) if that bidder is ultimately successful in winning the auction. The mechanism tracks whether each auction is subject to a "first bidder discount" and whether the winning bidder was the first bidder. The offering of a first bidder discount and the amount of any discount may be at the discretion of the seller of the item. The offering of a first bidder discount may encourage bidders to start bidding early in the duration of an auction and to continue bidding to ensure that they receive the discount.

Many different discount criteria can be used to encourage bidders to bid at an auction. For example, the auction system may allow successive bidders to be eligible for successively smaller discounts. That is, the first bidder may receive a 10% discount, and the second bidder may receive a 5% discount. Also, the discount criteria can be independent of the order in which the bidders placed their first bids. For example, a winning bidder who places a bid that is at least 5% larger than the second highest bid may receive a 10% discount. Such a discount criteria may encourage bidders to bid at least 5% more than the current highest bid.

BRIEF DESCRIPTION OF DRAWING

FIG. 1 illustrates a web page through which a seller lists an item to be auctioned.

FIG. 2 illustrates a web page through which a bidder may bid for the item being auctioned.

FIG. 3 illustrates a web page through which a seller may list an item to be auctioned with a first bidder discount.

FIG. 4 illustrates a web page through which a bidder may bid for an item being auctioned with a first bidder discount.

FIG. 5 illustrates a web page through which a bidder may bid for an item being auctioned with a first bidder discount that has had a bid already placed.

DETAILED DESCRIPTION

Figure 6:
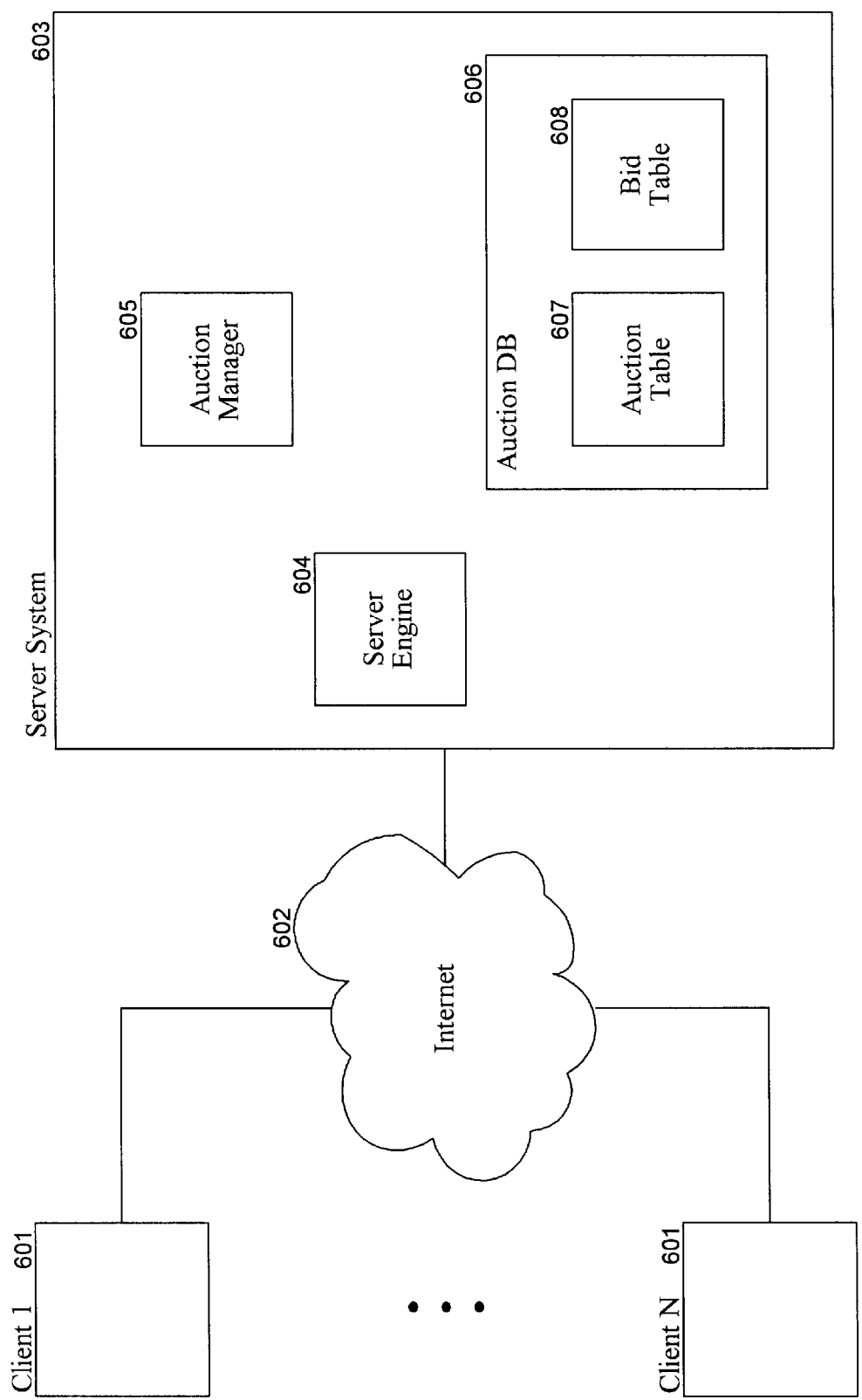
FIG. 6 is a block diagram illustrating the components of the auction system in one embodiment.

A method and system for conducting an auction that provides an incentive for a bidder to bid early and for early bidders to place the winning bid is provided. The auction system provides a discount from the winning bid to a winning bidder who meet a certain discount criteria. For example, the auction system may provide a 10% discount to a winning bidder who happened to place the first bid in the auction. That is, a first bidder who ultimately wins the auction will receive a 10% discount off the winning bid. For example, if the winning bid of $100 was placed by the first bidder at the auction, then that bidder purchases the item at the final price of $90. If, however, the winning bid of $100 was not placed by the first bidder, then that bidder receives no discount and purchases the item at the final price of $100. In such an example, the discount criteria is met when the winning bidder placed the first bid at the auction. By offering such a discount, a seller provides an incentive to bidders to bid early in the auction duration and to continue bidding to ensure they receive the 10% discount.

In one embodiment, the auction system allows a seller to specify whether the item to be auctioned is subject to a first bidder discount. Auctions that are subject to a first bidder discount are advertised as such to encourage the bidding to start early. For example, when a bidder searches for auctions that match a certain search query, the names of auctions that match that search query are listed along with an indication of whether the auction is subject to a first bidder discount. The indication may be an icon next to the auction name. The auction system may only display such indications when a first bid has not yet been placed at the auction. A bidder can then select to bid at auctions that offer a first bidder discount, rather than auctions for comparable items with no such first bidder discount. Also, a web page for an auction with a first bidder discount in which no bids have been placed may prominently indicate that the bidder would be entitled to a first bidder discount.

An auction system may provide many different variations of bidder discounts as indicated by discount criteria to provide incentives for bidders to place bids. For example, the auction system may allow the seller of the item to specify the percent (i.e., greater than 0%) or fixed dollar amount of the discount. In this way, each seller can select a discount that they believe is most appropriate for the auctioning of their item. The auction system may also allow the discount to be based on the first bid rather than the winning bid. For example, if the first bid is for $100 and the winning bid is for $150, then a 10% discount based on the first bid would result in a final price of $140 (i.e., $150−(100*10%)). The basing of discount on the first bid may tend to encourage first bidders to place first bids that are near what they perceive as the fair market value of the item. The discounts may also be limited by a minimum or maximum amount. For example, a seller may designate a 10% discount with a minimum discount of $5 or with a maximum discount of $20. In such a situation, if the winning bid is $45, then the minimum discount would apply and the final price would be $40. If the winning bid is $300, then the maximum discount would apply and the final price would be $280. More generally, the discounts can be calculated using any function of bid amounts. Moreover, the discounts need not be based on the amount of the bids. For example, a seller may offer to pay the shipping costs for a first bidder.

The auction system may also allow a bidder discount to be provided only when the first bid is ultimately the winning bid. For example, if the minimum starting bid is specified at $50, and only one bid is received at $100, then that bidder would be entitled to the discount. If, however, another bidder bids $110 and the first bidder then bids $120, then neither bidder would be entitled to a discount. Such a variation would encourage the first bidder to place a large first bid. With such a discount, the auction system would need to explicitly input the minimum bid for the first bidder. The auction system may also allow for bidder discounts to be provided at auctions for multiple quantities of an item, such as a Dutch auction. In such a multiple-quantity auction, the first bidder may receive a discount if that bidder places anyone of the winning bids. Alternatively, the auction system may give a first bidder discount only when the first bidder places the highest bid at the multiple-quantity auction.

The auction system may also allow the providing of discounts to bidders other than the first bidder. For example, the auction system may provide a 10% discount to the first bidder and a 5% discount to the second bidder if such bidders ultimately place the winning bid. If the second bidder ultimately places the winning bid, then the second bidder received a 5% discount. More generally, the auction system may allow a seller to specify the discount to be available to each of such bidders. For example, a seller may specify a 15% discount for the first bidder, a 10% discount for the second bidder, and a 5% discount for the third bidder.

The auction system may allow the cost of the discount to be borne by either the seller or the provider of the auction system or by some combination of the seller or provider. For example, a provider may offer a 5% discount of the winning bid to first bidders who ultimately win the auction and may charge a 5% of the winning bid service fee to the seller. In effect, the provider would be giving its service charge to the first bidder. The provider may offer such a discount to encourage participation in the auction or may offer such a discount under the assumptions that the service fees (because of increased bidding) in auctions that are not won by first bidders would more than make up for the loss as a result of the discount. As another example, the seller and provider may each bear 5% of the cost of a 10% discount.

The auction system may also allow discount criteria to apply to only certain bidders, certain sellers, certain items, or various combinations thereof. For example, the auction system may offer to a bidder who has won 5 auctions a 10% discount (limited to some maximum discount) on the next auction in which that bidder places the first bid. Such a discount would reward active bidders and would encourage continued participation in auctions. Other participants in such an auction may not even know that the first bidder is eligible to receive a discount. As other examples, the auction system may offer a discount to first time bidders, to bidders who match a certain demographic (e g., senior citizens), or to bidders based on their bidding or selling history (e.g., seller or bidder in a certain number of auctions or in auctions of a certain dollar amount). The auction system may also offer discounts in auctions whose sellers meet certain conditions, such as those described above for bidders. For example, the auction system may offer a discount in an auction that is offered by a seller who has recently sold items in 5 auctions. The provider would bear the cost of the discount, and the seller would receive the benefit of early and active bidding. The auction system may allow discounts or may provide discounts for certain types of items. For example, a provider who wants to encourage the auctioning of baseball cards may allow sellers to offer discounts at their cost or may bear the cost of discounts in all auctions for baseball cards.

The auction system may also allow discounts that are not limited to the order in which the bidders placed their first bids. For example, a 10% discount may be provided to a winning bidder whose winning bid is at least 5% higher than the next highest bid. Such a discount may encourage bids that are 5% higher than previous bids and may have the effect of an increasing bid increment.

FIG. 3 illustrates a web page through which a seller may list an item to be auctioned with a first bidder discount. The web page 300 is similar to the web page of FIG. 1 except for the addition of the first bidder discount field 301. The seller enters the information describing the auction as described with reference to FIG. 1. The seller, however, may select to offer a first bidder discount by selecting the "yes" radio button of the first bidder discount field. The auction system may include a first bidder discount flag in each entry of an auction database. The auction system sets this flag to indicate whether the auction has a first bidder discount.

FIG. 4 illustrates a web page through which a bidder may bid for an item being auctioned with a first bidder discount. The web page 400 is similar to the web page of FIG. 2 except for the notification that the auction is subject to a first bidder discount. The bidding area 401 includes an indication that if the bidder places the first bid, that bidder is eligible to receive the first bidder discount. The bidder is eligible in the sense that the bidder will only receive the first bidder discount, if the bidder ultimately places the winning bid. The web page also includes notification area 402 that indicates the availability of the first bidder discount.

FIG. 5 illustrates a web page through which a bidder may bid for an item being auctioned with a first bidder discount that has had a bid already placed. The web page 500 is similar to the web page of FIG. 2 except for the notification that the person who placed the first bid is eligible for the first bidder discount. The notification area. 501 indicates that the first bidder is entitled to a first bidder discount if the first bidder ultimately places the winning bid. The auction system may alternatively not provide any notification that the auction is subject to a first bidder discount after the first bid has been placed.

FIG. 6 is a block diagram illustrating the components of the auction system in one embodiment. The client computers 601 and the server computer 603 are interconnected via the Internet 602. The computers may include a central processing unit, memory, input devices (e.g., keyboard and pointing device), output devices (e.g., display devices), and storage devices (e.g., disk drives). The memory and storage devices are computer-readable media that may contain computer instructions that implement the auction system. The client computers may use a browser to access the web pages via the Internet. The server computer implements the auction system. The auction system includes a server engine 604, an auction manager 605, and an auction database 606. The server engine receives requests for resources (e.g., web pages) via the Internet and coordinates the generation and transmission of the resources. The auction manager coordinates the conducting of the auctions. The auction manager stores auction listings and bidding histories in the auction database. When an auction closes, the auction manager selects the winning bidder, applies the first bidder discount as appropriate, and notifies the winning bidder and the seller. The auction database includes an auction table 607 and a bid table 608: The auction table includes an entry for each auction. Each entry contains a flag indicating whether the auction is subject to the first bidder discount. The bid table includes an entry for each bid that has been placed for each auction. When the auction is closed, the auction manager accesses the bid table to identify the winning bidder and to determine whether to apply the first bidder discount.

One skilled in the art will appreciate that the concepts of the auction system can be using various environments other then the Internet. For example, the concepts can also be used in an electronic mail environment in which electronic mail messages may be used to provide information on auctions and to place bids at the auctions. Also, various communication channels may be used such as a local area network, wide area network, or a point-to-point dial-up connection instead of the Internet. The server system may comprise any combination of hardware or software that can support these concepts. In particular, a web server may actually include multiple computers. A client system may comprise any combination of hardware software that interacts with the server system. The client systems may include television-based systems and various other consumer products through which auctions may be conducted. Moreover, the concepts of the present invention may be applied to auctions that are not supported by computer systems or that are only partially supported by computer systems.

Figure 7:
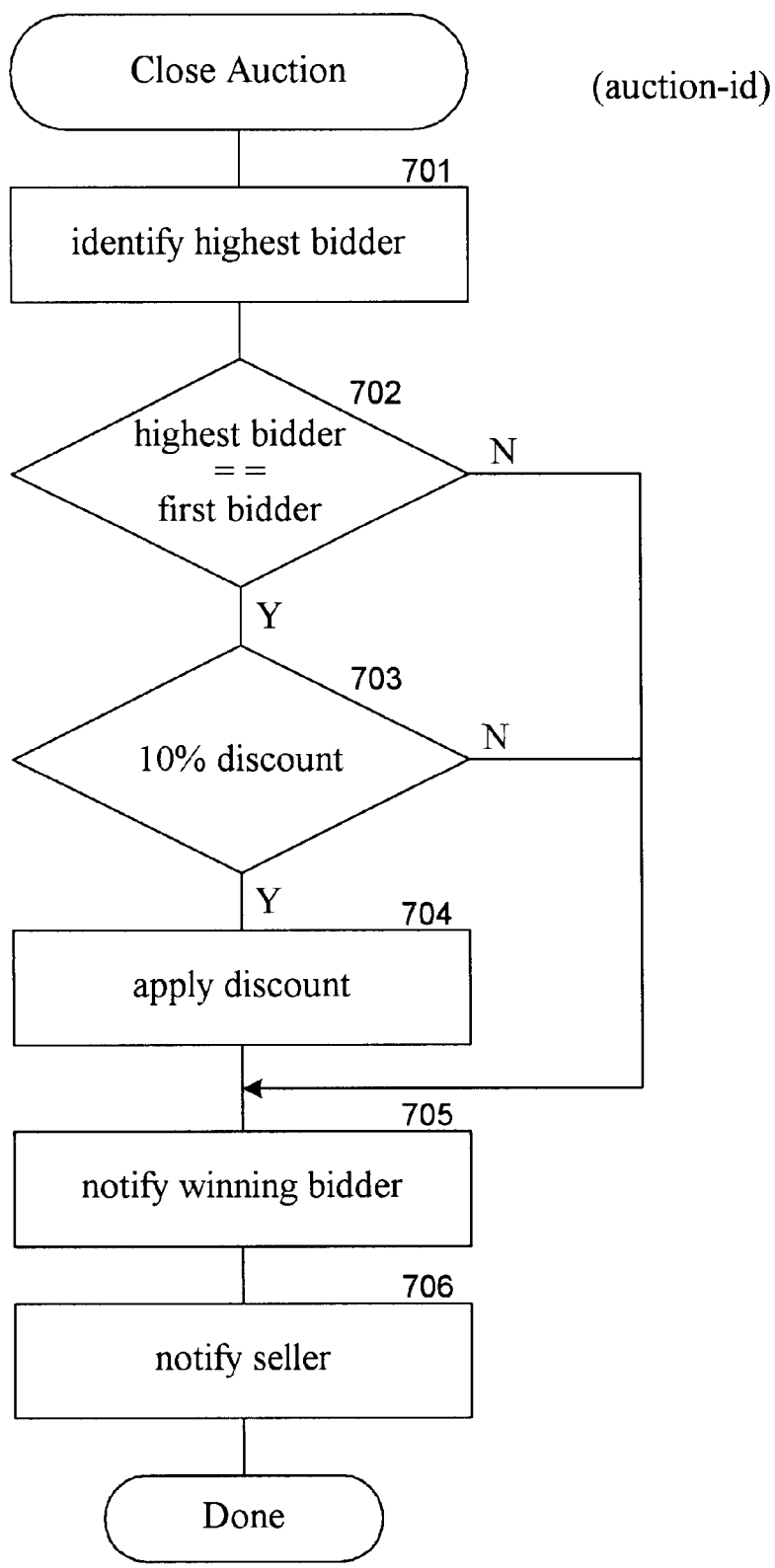
FIG. 7 is a flow diagram that illustrates example processing of a function of the auction manager to process a closed auction.

FIG. 7 is a flow diagram that illustrates example processing of a function of the auction manager to process a closed auction. The function is passed the identification of the auction that has been closed because, for example, its duration has expired. The function determines whether the auction is subject to a first bidder discount and whether the bidder who placed the winning bid is eligible for that discount. If so, the function applies the discount and notifies the seller and the winning bidder. In step 701, the function identifies the bidder who placed the highest bid by reviewing the bidding history in the bid table. In step 702, if the bidder who placed the highest bid also placed the first bid, then the function continues at step 703, else the function continues at step 705. In step 703, if the closed auction is subject to a first bidder discount, then the function continues at step 704, else the function continues at step 705. In step 704, the function applies the discount to the winning bid to generate a discounted final price. In step 705, the function notifies the winning bidder of the final price. In step 706, the function notifies the seller of the final price and then completes.

From the foregoing it will be appreciated that although specific embodiments of the auction system have been described for purposes of illustration, various modifications may be made without deviating from the spirit and the scope of the invention. Accordingly, the invention is not limited except by the following claims.

What is claimed is:

1. A method in a computer for conducting an auction, the method including:
   providing a description of an item to be auctioned;
   receiving at the computer one or more auction bids for the item; and
   under control of the computer when the auction has concluded, setting a final auction price for the item at a discount from a winning auction bid for a winner bidder when the wining bidder placed the first bid at the auction.

2. The method of claim 1 wherein a seller of the item designates the discount.

3. The method of claim 1 wherein the auction is for a quantity of one.

4. The method of claim 1 wherein the auction is for a quantity of more than one.

5. The method of claim 1 wherein the auction is a Dutch auction.

6. The method of claim 1 wherein the discount is given only when the first bid placed is the winning bid.

7. The method of claim 1 wherein the discount is based on amount of the first bid.

8. The method of claim 1 wherein the discount is specified to be at least a minimum discount.

9. The method of claim 1 wherein the discount is specified to be at most a maximum discount.

10. The method of claim 1 wherein the discount is borne by a seller of the item.

11. The method of claim 1 wherein the discount is borne by a provider of the auction.

12. The method of claim 1 wherein the discount is given to only certain bidders.

13. The method of claim 1 wherein the discount is given at an auction only when the seller meets a certain condition.

14. The method of claim 1 wherein the discount is given for only certain items.

15. A method in a computer system for conducting an auction, the method including:
   displaying a description of an item to be auctioned;
   receiving at the computer system a bid for the item; and
   under control of the computer system, when the received bid is the winning bid, receiving a discount on the price for the item when the winner bidder placed the first bid at the auction.

16. The method of claim 15 wherein the discount is received when the winning bid is the first bid placed at the auction.

17. The method of claim 15 wherein a seller of the item designates the discount.

18. The method of claim 15 wherein the auction is for a quantity of one.

19. The method of claim 15 where in the auction is for a quantity of more than one.

20. The method of claim 15 wherein the auction is a Dutch auction.

21. The method of claim 15 wherein the discount is based on amount of the first bid.

22. The method of claim 15 wherein the discount is specified to be at least a minimum discount.

23. The method of claim 15 wherein the discount is specified to be at most a maximum discount.

24. The method of claim 15 wherein the discount is borne by a seller of the item.

25. The method of claim 15 wherein the discount is borne by a provider of the auction.

26. The method of claim 15 wherein the discount is received by only certain bidders.

27. The method of claim 15 wherein the discount is given at an auction only when the seller meets a certain condition.

28. The method of claim 15 wherein the discount is applied to only certain items.

29. A method in a computer system for conducting an auction, the method including:
   providing a description of an item to be auctioned;
   receiving at the computer system one or more bids for the item; and
   under control of the computer system,
      selecting a winning bid; and
      discounting the selected winning bid when the winning bid is placed by the first bidder at the auction.

30. The method of claim 29 wherein a seller of the item designates the discount.

31. The method of claim 29 wherein the auction is for a quantity of one.

32. The method of claim 29 wherein the auction is for a quantity of more than one.

33. The method of claim 29 wherein the auction is a Dutch auction.

34. The method of claim 29 wherein the discount is based on amount of the first bid.

35. The method of claim 29 wherein the discount is specified to be at least a minimum discount.

36. The method of claim 29 wherein the discount is specified to be at most a maximum discount.

37. The method of claim 29 wherein the discount is borne by a seller of the item.

38. The method of claim 29 wherein the discount is borne by a provider of the auction.

39. The method of claim 29 wherein the discounting is provided to only certain bidders.

40. The method of claim 29 wherein the discounting is given at an auction only when the seller meets a certain condition.

41. The method of claim 29 wherein the discounting is provided to only certain items.

42. A computer-readable medium containing instructions for causing a computer system to conduct an auction, by:
   providing a description of an item to be auctioned;
   receiving at the computer system one or more auction bids for the item; and under control of the computer system when the auction has concluded, setting a final auction price for the item at a discount from a winning auction bid for a winner bidder when the winning bidder placed the first bid at the auction.

43. The computer-readable medium of claim 42 wherein a seller of the item designates the discount.

44. The computer-readable medium of claim 42 wherein the auction is for a quantity of one.

45. The computer-readable medium of claim 42 wherein the auction is for a quantity of more than one.

46. The computer-readable medium of claim 42 wherein the auction is a Dutch auction.

47. The computer-readable medium of claim 42 wherein the discount is based on amount of the first bid.

48. The computer-readable medium of claim 42 wherein the discount is specified to be at least a minimum discount.

49. The computer-readable medium of claim 42 wherein the discount is specified to be at most a maximum discount.

50. The computer-readable medium of claim 42 wherein the discount is borne by a seller of the item.

51. The computer-readable medium of claim 42 wherein the discount is borne by a provider of the auction.

52. The computer-readable medium of claim 42 wherein the discount is provided for only certain bidders.

53. The computer-readable medium of claim 42 wherein the discount is given at an auction only when the seller meets a certain condition.

54. The computer-readable medium of claim 42 wherein the discount is provided for only certain items.

* * * * *